United States Patent [19]

Froemming et al.

[11] Patent Number: 5,323,965
[45] Date of Patent: Jun. 28, 1994

[54] HINGE END SEAL

[75] Inventors: Kenneth W. Froemming, Palm Beach Gardens; Eric J. Ward, Riviera Beach, both of Fla.

[73] Assignee: The United States of America as represented by the Secretary of the Air Force, Washington, D.C.

[21] Appl. No.: 67,755

[22] Filed: May 26, 1993

[51] Int. Cl.⁵ .............................................. B64C 9/00
[52] U.S. Cl. ............................................. 239/265.37
[58] Field of Search ............... 239/265.11, 265.19, 239/265.33, 265.35, 265.39, 265.37; 60/230, 232, 271; 277/175, 236

[56] References Cited

U.S. PATENT DOCUMENTS

| | | | |
|---|---|---|---|
| 2,699,645 | 1/1955 | Oulianoff et al. | 239/265.37 X |
| 2,840,985 | 7/1958 | Elliott | 239/265.37 |
| 3,892,358 | 7/1975 | Gisslen | 239/265.39 |
| 4,047,667 | 9/1977 | McCullough et al. | 239/265.35 |
| 4,110,972 | 9/1978 | Young et al. | 60/271 X |
| 4,128,208 | 12/1978 | Ryan et al. | 60/271 X |
| 4,575,006 | 3/1986 | Madden | 239/265.37 X |
| 4,690,329 | 9/1987 | Madden | 239/265.19 |
| 4,739,932 | 4/1988 | Szuminski et al. | 239/265.33 |
| 4,783,085 | 11/1988 | Wicks et al. | 239/265.11 X |
| 4,813,608 | 3/1989 | Holowach et al. | 239/265.37 |
| 4,917,302 | 4/1990 | Steinetz et al. | 239/265.11 |
| 5,011,080 | 4/1991 | Barcza et al. | 239/265.39 |
| 5,014,917 | 5/1991 | Sirocky et al. | 239/265.11 |
| 5,115,979 | 5/1992 | Ellerhorst et al. | 239/265.37 |
| 5,143,292 | 9/1992 | Corsmeier et al. | 239/265.37 X |

FOREIGN PATENT DOCUMENTS 722616  1/1955  United Kingdom ........... 239/265.37

Primary Examiner—Andres Kashnikow
Assistant Examiner—Lesley D. Morris
Attorney, Agent, or Firm—Jacob N. Erlich; Stanton E. Collier; Thomas C. Stover

[57] ABSTRACT

A gap seal for convergent/divergent flap hinge ends to spaced disc and wall surfaces in a 2-D nozzle of a gas turbine engine is provided. The seal employs at least two cups resiliently mounted to the hinge ends, which cups independently translate axially and resiliently to contact the spaced surfaces at different or varying gaps to seal same. The translating cup seals of the invention thus maintain a constant seal in the gaps between the hinge ends and such surfaces at varying C/D hinge positions and varying operating conditions in the 2-D nozzle. That is, the cups independently maintain their seals across gaps as they expand or contract due to thermal changes as well as across gaps of different sizes.

6 Claims, 3 Drawing Sheets

5,323,965

HINGE END SEAL

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to sealing between hinge ends and wall surfaces particularly sealing across gaps of different or varying widths.

2. The Prior Art

In 2-D nozzles of a gas turbine engine having hinged convergent and divergent flaps, there has been a problem providing a seal between the convergent/divergent (C/D) hinge ends and the spaced disc and/or wall surfaces at each such end. Such seal has been made difficult particularly where the gap between each hinge and sidewall is uneven, stepped and the like with the resulting problem of how to maintain a seal between moving hinge ends and stationary wall across varying gaps therebetween.

Prior art references in this area include U.S. Pat. No. 4,690,329 to Madden (1987) and U.S. Pat. No. 5,014,917 to Sirocky et al. (1991) but none appear to address the above varying gap sealing problem.

Accordingly, there is a need and market for a multilevel gap seal that overcomes the above prior art problem.

There has now been discovered a hinge end seal for bridging varying gaps between each hinge end and a spaced wall, wherein such seal is maintained though the hinge ends pivot relative to such wall.

SUMMARY OF THE INVENTION

Broadly the present invention provides, in a 2-D nozzle of a gas turbine engine, having a C/D flap hinge, the hinge joining a convergent flap and a divergent flap, a varying gap seal between the hinge ends and differently spaced proximate wall surfaces and/or convergent disc surfaces comprising, a plurality of cups resiliently mounted to the hinge ends, which cups move axially back and forth or reciprocate to contact the spaced surfaces across varying gaps to seal same and maintain such seal at varying flap positions and varying operating conditions of the 2-D nozzle.

By "C/D" as used herein is meant "convergent/divergent" as in, e.g. "C/D flaps" or "C/D hinge."

Thus a gap seal for C/D flap hinge ends to spaced disc and wall surfaces in a 2-D nozzle of a gas turbine engine is provided. That is, the cups independently maintain their seals across gaps as they expand or contract due to thermal changes as well as across gaps of different sizes.

BRIEF DESCRIPTION OF THE DRAWINGS

The invention will become more apparent from the following detailed specification and drawings in which.

DESCRIPTION OF PREFERRED EMBODIMENTS

Figure 1:
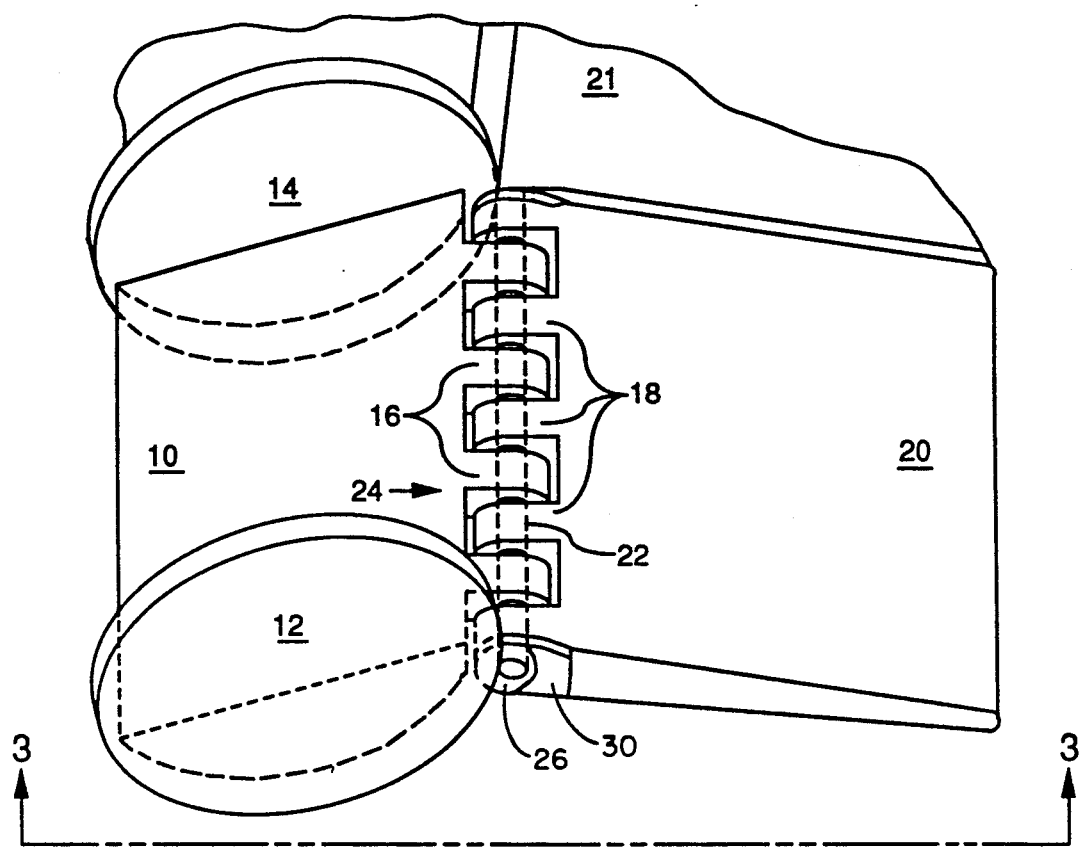
FIG. 1 is a schematic perspective view of hinge components according to the present invention.
Figure 2:
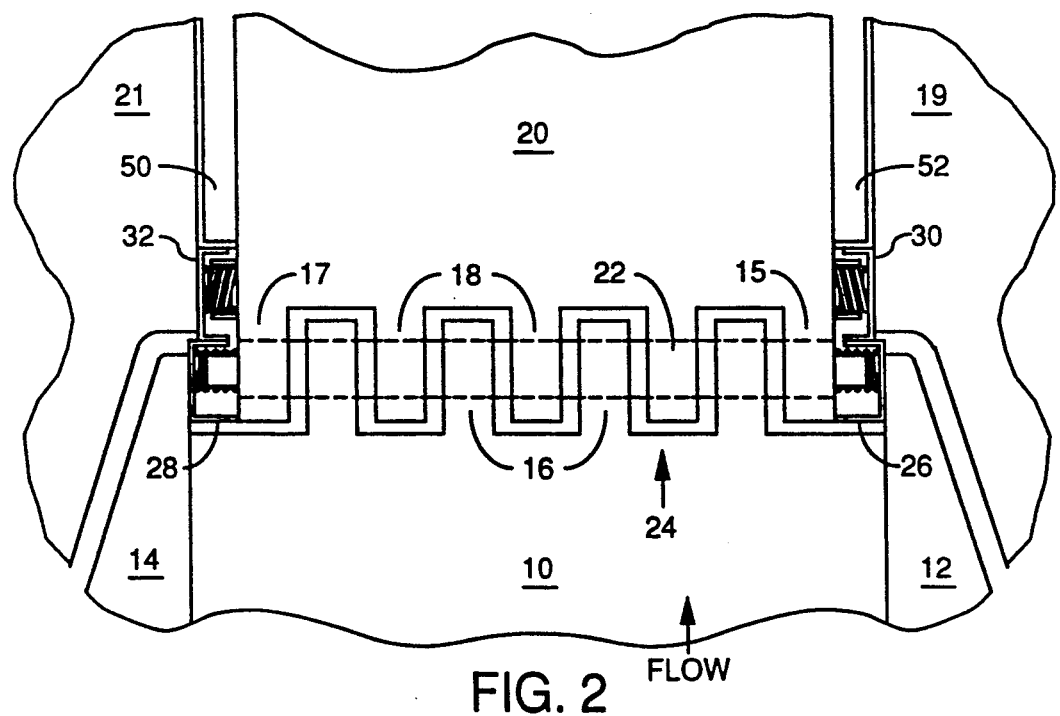
FIG. 2 is a fragmentary schematic plan view of the hinge components of the embodiment of FIG. 1, along with other components related thereto.

Referring in more detail to the drawings, convergent flap 10 having rounded ends 12 and 14, has a hinge member 16 which dovetails with a hinge member 18 of divergent flap 20, as shown in FIGS. 1 and 2. The hinge members 16 and 18 are joined by a hinge pin 22, which three elements together define a C/D hinge assembly 24, as shown in FIGS. 1 and 2.

At each end of the hinge assembly 24 are resiliently mounted cup seals 26 & 30 and 28 & 32, which bridge varying gaps between the divergent flap hinge ends 15 and 17 and their respective convergent disc and static sidewall, as indicated in FIG. 2. That is, gaps are bridged between divergent flap hinge end 15 and convergent disc 12 and static sidewall 19, at one end of such divergent flap and at the other end thereof, gaps are bridged between divergent flap hinge end 17 and convergent disc 14 and static sidewall 21, as shown in FIG. 2.

Figure 4:
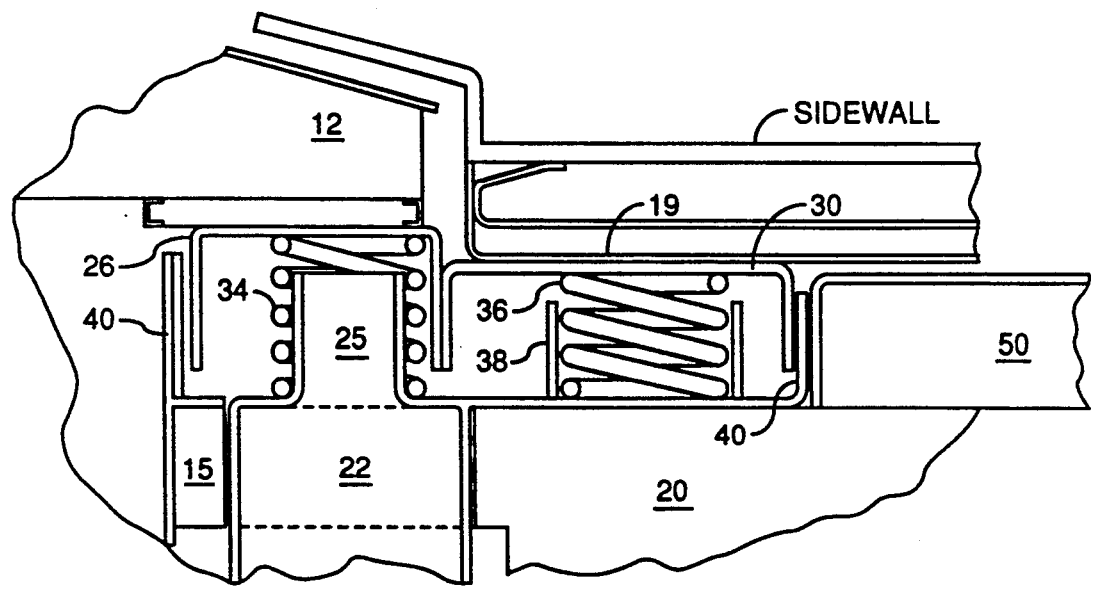
FIG. 4 is an enlarged fragmentary schematic sectional plan view of portions of the components of the invention taken on line 4—4 of FIG. 3, looking in the direction of the arrows.

Referring now in more detail to divergent flap hinge end member 15, as shown in FIG. 4, we see that the two cup seals 26 and 30 are translating cups that are spring-loaded respectively, against convergent disc 12 and static sidewall 19. That is, a spring 34 fits around a lug 25 of hinge pin 22, while cup 30 is resiliently supported by helical spring 36, as constrained within tubular guide 38, mounted on the edge of the divergent flap 20, as shown in FIG. 4. The cups 26 and 30 are also constrained by hinge cover and guide 40, mounted on the divergent flap 20, which cups translate independently of each other, as shown or indicated in FIGS. 4, 5 and 6. As shown in FIGS. 2 and 4, cup 26 seals against a recessed land on the convergent disc 12 while cup 30 seals against the sidewall panel 19. The other end of the hinge assembly 24 is sealed by spring-loaded translating cups 28 and 32 to disc 14 and panel 21, respectively, in the same manner as discussed above with respect to FIGS. 4 and 2.

Figure 3:
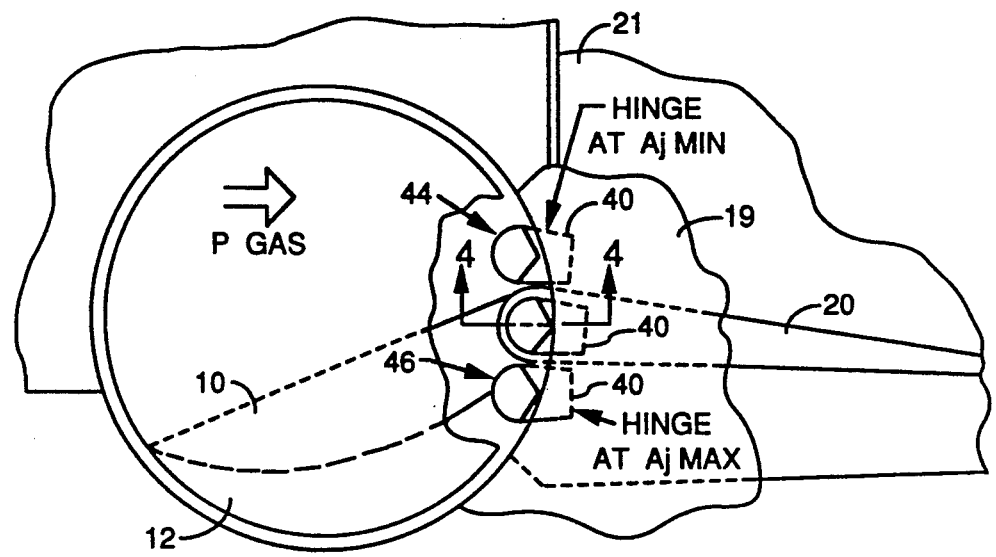
FIG. 3 is a fragmentary schematic elevation view of hinge seal components of the invention taken on line 3—3 of FIG. 1, looking in the direction of the arrows.
Figure 5:
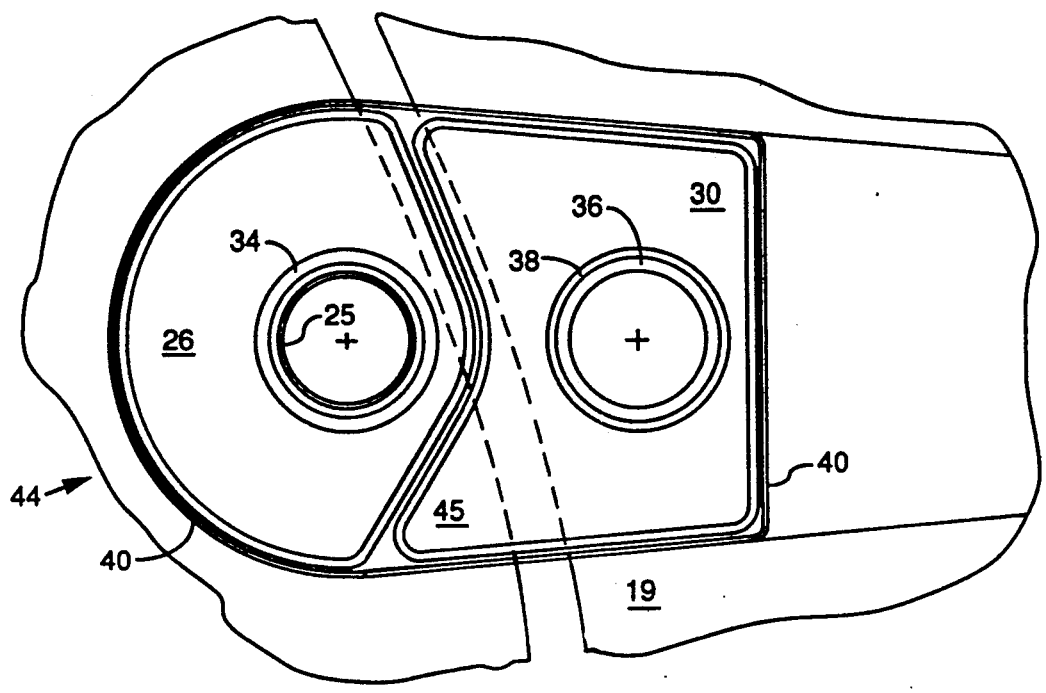
FIGS. 5 and 6 are enlarged fragmentary schematic elevation views of the hinge end seals of the invention of FIG. 3, in two operating positions.
Figure 6:
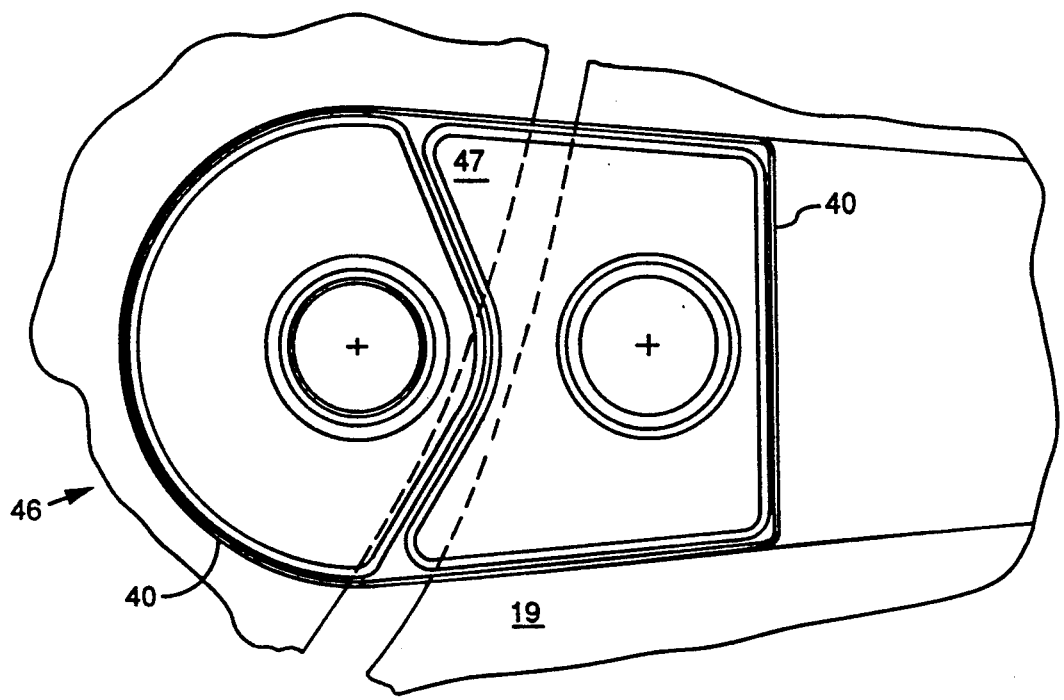

In operation, per FIGS. 3, 5 and 6, the C/D flaps 10 and 20 pivot at their hinge pin 22, per FIGS. 2, 5 and 6, from upper hinge position 44 (Aj.min.) to lower hinge position 46 (Aj.max.), as shown or indicated in FIGS. 3, 5 and 6.

While the C/D flaps are so pivoting, e.g. the translating cups 26 and 30, are maintaining their resilient contact with respectively, the convergent disc 12 and the static sidewall 19, as shown or indicated in FIGS. 3, 4, 5 and 6.

The forward translating cup seal 26 is shaped so as to prevent overlap with the static sidewall 19 (per FIGS. 4, 5 and 6), from the upper hinge stroke position 44, to the lower hinge stroke position 46, as shown in FIGS. 3, 5 and 6.

The aft translating cup seal 30 mates with the above cup seal 26 but at a lower elevation, per FIG. 4 and can overlap the convergent disc 12. That is, the aft translating cup 30 seal has clearance to rotate a wing portion 45 under the convergent disc 12, e.g. in upper hinge position 44 per FIGS. 3, 4 and 5 while such cup seal 30 rotates the other wing portion 47 under the convergent disc 12, in lower hinge position 46, per FIGS. 3, 4 and 6.

Despite the overlap of the above wing portions 45 and 47, with the convergent disc 12, there is clearance therebetween in all operating conditions because the convergent disc 12 is sufficiently recessed relative to the static sidewall 19 and the aft translating cup seal 30, as indicated in FIGS. 4, 5 and 6. The resulting sealing benefit is that the translating cup seals 26 and 30 can independently seal against the convergent disc 12 and the static sidewall 19 respectively, with minimal gas leakage thereat.

The primary benefit of the invention is to provide translating cups as a constant seal across various gap widths at each C/D hinge end and the disc and static sidewall panel proximate thereto as noted above. The invention thus provides, in a 2-D nozzle, a seal between flow path gas ($P_{gas}$) and ambient air ($P_{amb}$) at the C/D hinge-disc,sidewall zone that has previously proved difficult to seal.

The translating cup design of the present invention offers a) a constant seal between Pgas and Pamb at all times during nozzle operation and at various C/D flap positions, e.g. per FIGS. 3, 4, 5 and 6. Also the translating cup seal of the invention provides b) a relatively wide area of sealing, thus reducing the contact load on the disc and sidewall panel and c) allows the respective parts to thermally grow freely (expand or contract) while sealing therebetween at all times.

As for sealing outside of the C/D hinge area, particularly at the side edges of the rest of the divergent flap 20, between such edges and the static sidewalls 19 and 21 of FIG. 2, such sealing is provided, e.g. by divergent flap sidewall seals 50 and 52, as shown in FIGS. 2 and 4. Such sidewall seals, however, are, e.g. flexible strip seals (rather than translating cup seals) and accordingly are not part of the present invention.

What is claimed is:

1. In a 2-D nozzle of a gas-turbine engine having a C/D flap said hinge terminating in hinge ends and joining a convergent flap and a divergent flap, a varying gap seal from each of said hinge ends to proximately spaced surfaces comprising, a plurality of cups resiliently mounted to each of said hinge ends, which cups move axially on resilient means to contact said spaced surfaces across variable gaps to seal same and maintain such seal at varying flap positions and varying operating conditions of said 2-D nozzle.

2. The gap seal of claim 1 wherein said cup seals move axially independently to contact said spaced surfaces.

3. The gap seal of claim 1 wherein said cups are mounted on helical springs which in turn are mounted to each side edge of said divergent flap.

4. The gap seal of claim 3 wherein said cups are constrained in an enclosure mounted to a side edge of said divergent flap.

5. The gap seal of claim 1 wherein said convergent flap is mounted between a pair of discs and a pair of sidewalls and a pair of cup seals are independently and resiliently mounted at each end of such hinge to seal the gaps between each hinge end and one of said discs and one of said sidewalls.

6. The gap seal of claim 5 wherein a first cup seal engages one of said discs across a first gap and a second cup seal engages one of said sidewalls across a second gap, said second cup seal overlapping one of said discs in spaced proximity at a plurality of said flap positions.

* * * * *